United States Patent
Nedachi et al.

(10) Patent No.: US 8,406,976 B2
(45) Date of Patent: Mar. 26, 2013

(54) CLUTCH CONTROL DEVICE AND CLUTCH CONTROL CORRECTION AMOUNT CALCULATING METHOD

(75) Inventors: Yoshiaki Nedachi, Saitama (JP); Hiroyuki Kojima, Saitama (JP); Junya Watanabe, Saitama (JP); Takashi Ozeki, Saitama (JP); Yoshiaki Tsukada, Saitama (JP); Kazuyuki Fukaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 779 days.

(21) Appl. No.: 12/461,646

(22) Filed: Aug. 19, 2009

(65) Prior Publication Data

US 2010/0057318 A1    Mar. 4, 2010

(30) Foreign Application Priority Data

Sep. 1, 2008  (JP) ................. 2008-223952

(51) Int. Cl.
*G06F 7/00*    (2006.01)
(52) U.S. Cl. .......................... 701/68; 701/67
(58) Field of Classification Search .............. 701/67–68; 192/3.51–3.63, 48.601, 85.63, 85.39, 109 F, 192/30 W; 477/7–8, 39, 57, 62, 70, 72, 76–77, 477/79, 83, 166–181
See application file for complete search history.

(56) References Cited

U.S. PATENT DOCUMENTS

| | | | | |
|---|---|---|---|---|
| 3,968,732 A * | 7/1976 | Fitzgerald | .................. | 91/517 |
| 4,650,047 A * | 3/1987 | Nishikawa et al. | .......... | 192/3.31 |
| 5,527,236 A * | 6/1996 | Kimura et al. | ................ | 477/131 |
| 7,006,907 B2 * | 2/2006 | Usuki et al. | ..................... | 701/51 |
| 7,445,107 B2 * | 11/2008 | Kawamoto et al. | ........ | 192/85.63 |
| 2002/0065171 A1 * | 5/2002 | Raber | ............................ | 477/175 |
| 2004/0186637 A1 * | 9/2004 | Isogai et al. | .................... | 701/29 |
| 2005/0061599 A1 * | 3/2005 | Budal et al. | .................. | 192/48.9 |
| 2005/0222735 A1 * | 10/2005 | Usuki et al. | .................... | 701/51 |
| 2009/0143949 A1 * | 6/2009 | Fukaya et al. | ................. | 701/67 |
| 2009/0299590 A1 * | 12/2009 | Nedachi et al. | ................. | 701/68 |
| 2010/0250079 A1 * | 9/2010 | Kawamoto | ..................... | 701/68 |
| 2011/0190996 A1 * | 8/2011 | Nedachi et al. | ................. | 701/67 |

FOREIGN PATENT DOCUMENTS

| | | |
|---|---|---|
| DE | 103 16419 A1 | 11/2003 |
| DE | 10 2005 019 042 A1 | 11/2005 |
| EP | 2 065 608 A1 | 6/2009 |
| JP | 2004-197842 | 7/2004 |
| JP | 2008232271 A * | 10/2008 |

* cited by examiner

Primary Examiner — John Q Nguyen
Assistant Examiner — Michael Ng
(74) Attorney, Agent, or Firm — Squire Sanders (US) LLP (57) ABSTRACT

Oil pressure detecting means 150 detects a clutch oil pressure in driving a clutch in its engaging direction against a biasing force of a return spring 12 for normally disengaging the clutch. Stroke end detecting means 140 detects that the clutch has reached a stroke end position where clutch disks are in contact with each other when the amount of change in clutch oil pressure becomes larger than a predetermined value. Clutch control correction amount calculating means 130 calculates a work load generated in the return spring 12 according to the clutch oil pressure detected at the stroke end position and then calculates a control correction amount for the clutch according to the difference between the work load calculated above and a predetermined reference value.

14 Claims, 7 Drawing Sheets

CLUTCH CONTROL DEVICE AND CLUTCH CONTROL CORRECTION AMOUNT CALCULATING METHOD

BACKGROUND

1. Field

Embodiments of the present invention relate to a clutch control device and a clutch control correction amount calculating method. More particularly, embodiments relate to a clutch control device and a clutch control correction amount calculating method which can calculate a control correction amount for a clutch by detecting a load required for engagement of the clutch.

2. Description of the Related Art

Conventionally known is a clutch device for connecting and disconnecting a rotational drive force from a power source to a transmission, wherein the engagement/disengagement of the clutch is automatically controlled by an actuator according to a starting operation or a shift operation. For example, in the case where the clutch disks in such a clutch device are worn to cause a change in clutch condition, there is a possibility that the torque capacity of the clutch may be deviated to cause a change in running feel at starting or shifting.

Japanese Patent Laid-Open No. 2004-197842 ("JP '842) discloses a clutch device having a configuration such that the amount of movement of a given member driven by an actuator is detected to thereby obtain the stroke of the clutch disks until they come into contact with each other. The drive amount for the actuator is changed according to a change in this stroke.

In the technique described in JP '842, however, it is necessary to provide a displacement sensor for detecting the amount of movement of the given member driven by the actuator.

Further, in a clutch device having such a configuration that the clutch is normally biased in its disengaging direction by a return spring and is operated in its engaging direction by driving an actuator, there is a possibility that a change in biasing force of the return spring due to variations in product quality or aged deterioration may cause improper engagement of the clutch in spite of the fact that the actuator is driven with a predetermined control amount, resulting in an adverse effect on the running feel. In the technique described in JP '842, the stroke of the clutch can be detected, but a change in clutch condition as mentioned above cannot be detected.

SUMMARY

According to one embodiment of the invention, a clutch control device for a hydraulic clutch configured to connect and disconnect a rotational drive force from an engine to a transmission in a vehicle is provided. Clutch disks are operated in their engaging direction against a biasing force of a return spring by driving an actuator. The clutch control device includes a clutch control configured to control the clutch, and a stroke end detector configured to detect that the clutch has reached a stroke end position where the clutch disks are in contact with each other. The clutch control device also includes an oil pressure detector configured to detect an oil pressure supplied to the clutch, and a control correction amount calculator configured to calculate a work load generated in the return spring according to the oil pressure detected at a time when the clutch has reached the stroke end position. The control correction amount calculator is also configured to calculate a control correction amount for the clutch according to a difference between the calculated work load and a predetermined reference value.

According to another embodiment, a clutch control correction amount calculating method for a hydraulic clutch for connecting and disconnecting a rotational drive force from an engine to a transmission in a vehicle is provided. Clutch disks are operated in their engaging direction against a biasing force of a return spring by driving an actuator. The clutch control correction amount calculating method includes detecting that the clutch has reached a stroke end position where the clutch disks are in contact with each other. The method also includes calculating a work load generated in the return spring according to an oil pressure detected when the clutch has reached the stroke end position. The method further includes calculating a control correction amount for the clutch according to a difference between the calculated work load and a predetermined reference value.

According to another embodiment, a clutch control device for a hydraulic clutch for connecting and disconnecting a rotational drive force from an engine to a transmission in a vehicle is provided. Clutch disks are operated in their engaging direction against a biasing force of a return spring by driving an actuator. The clutch control device includes clutch control means for controlling said clutch, and stroke end detecting means for detecting that said clutch has reached a stroke end position where the clutch disks are in contact with each other. The device further includes oil pressure detecting means for detecting an oil pressure supplied to the clutch, and control correction amount calculating means for calculating a work load generated in the return spring according to the oil pressure detected when the clutch has reached the stroke end position, and for calculating a control correction amount for the clutch according to a difference between the calculated work load and a predetermined reference value.

According to another embodiment, a computer program, embodied on a computer readable medium is provided. The computer program is configured to control a processor to perform operations including detecting that a hydraulic clutch comprising clutch disks has reached a stroke end position where said clutch disks are in contact with each other. The operations may further include calculating a work load generated in a return spring of said clutch disks according to an oil pressure detected when said clutch has reached said stroke end position, and calculating a control correction amount for said clutch according to a difference between said calculated work load and a predetermined reference value. A computer readable medium may be any available media that can be accessed by a processor and includes both volatile and non-volatile memory, removable and non-removable media, and communications media. Communication media may include computer readable instructions, data structures, program modules or other data in a modulated signal.

BRIEF DESCRIPTION OF THE DRAWINGS

For proper understanding of the invention, reference should be made to the accompanying drawings, wherein.

DETAILED DESCRIPTION

Figure 1:
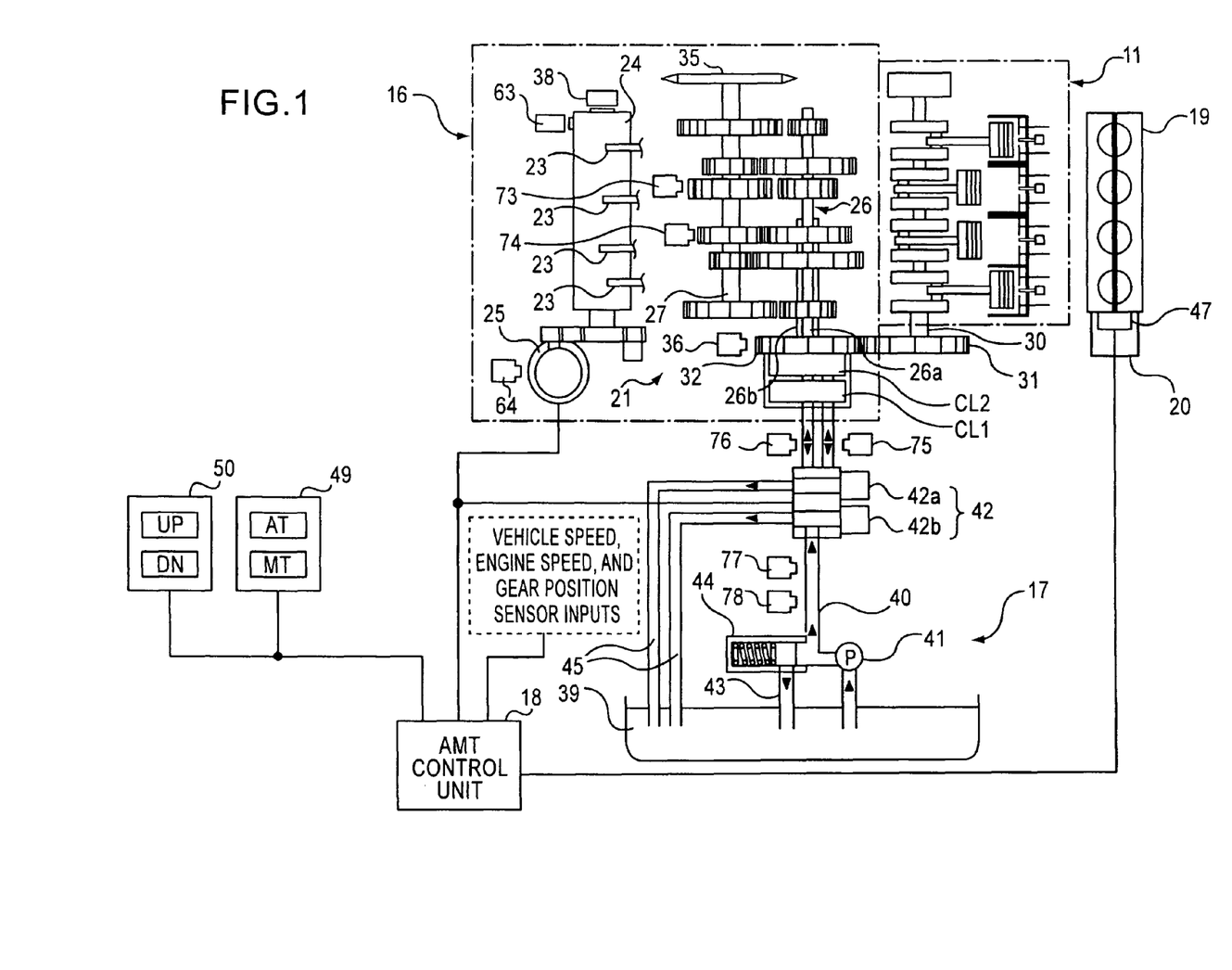
FIG. 1 is a schematic diagram showing a system configuration of an AMT and its peripheral devices according to a one embodiment of the present invention.
Figure 2:
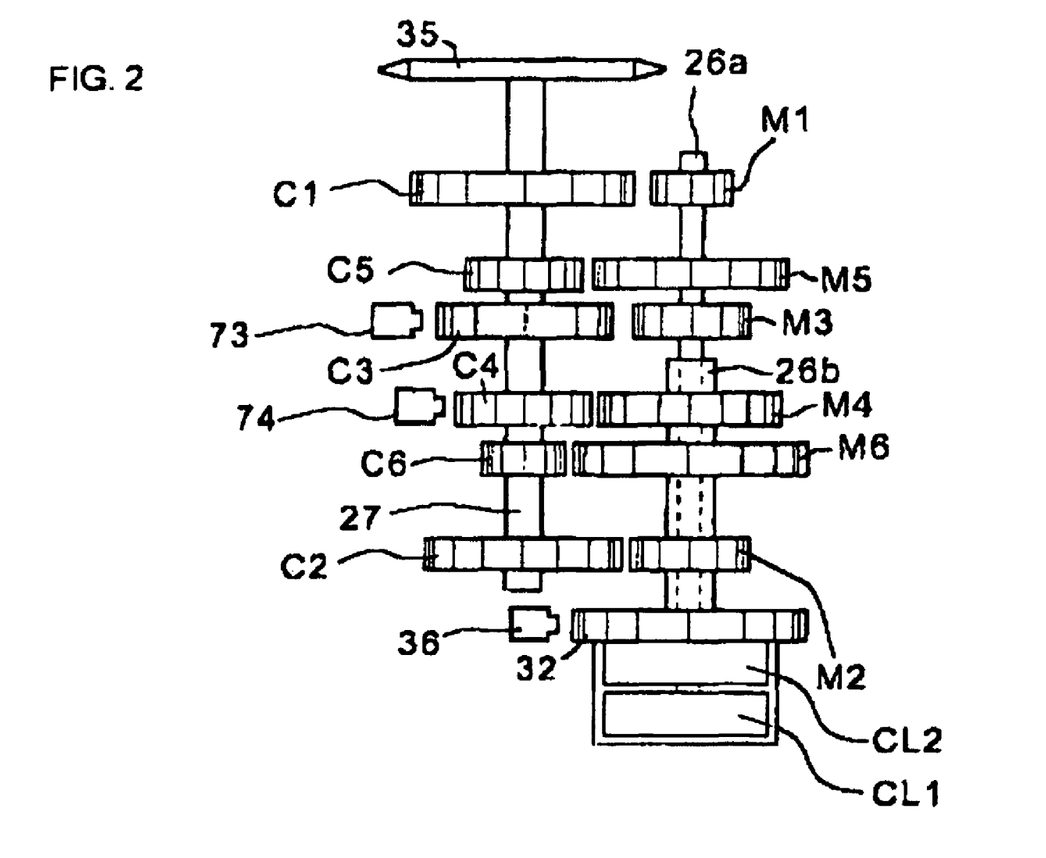
FIG. 2 is a layout diagram showing shafts and shift gear meshing in the AMT according to one embodiment.

Embodiments of the present invention will now be described in detail with reference to the drawings. FIG. 1 is a schematic diagram showing a system configuration of an automatic manual transmission ("AMT") 16 as an automatic transmission and its peripheral devices applied to a motorcycle. FIG. 2 is a layout diagram showing shafts and shift gear meshing in the AMT 16. The AMT 16 may be a twin clutch type transmission having two clutches provided on a main shaft for connecting and disconnecting the transmission of a rotational drive force from an engine. The AMT 16 is connected to an engine 11 and is controlled in operation by a clutch hydraulic device, 17 and an AMT control unit 18 as a shift control device. The engine 11 has a throttle-by-wire type throttle body 19, and this throttle body 19 is provided with a throttle opening/closing motor 20.

The AMT 16 includes a forward six-speed, transmission 21, first clutch CL1, second clutch CL2, shift drum 24, and shift control motor 25 for rotating the shift drum 24. A plurality of gears constituting the transmission 21 are connected fixedly or loosely to a main shaft 26 and a counter shaft 27. The main shaft 26 may be composed of an inner main shaft 26a and an outer main shaft 26b. The inner main shaft 26a is connected to the first clutch CL1, and the outer main shaft 26b is connected to the second clutch CL2. Shift gears are axially, displaceably provided on the main shaft 26 and the counter shaft 27. Shift forks 23 are engaged at their opposite ends to the shift gears and guide grooves (not shown) formed on the shift drum 24.

A primary drive gear 31 may be connected to an output shaft, such as crankshaft 30, of the engine 11. The primary drive gear 31 is in mesh with a primary driven gear 32. The primary driven gear 32 is connected through the first clutch CL1 to the inner main shaft 26a and also connected through the second clutch CL2 to the outer main shaft 26b. The AMT 16 may further include an inner main shaft rotational speed sensor 73 and an outer main shaft rotational speed sensor 74 for respectively detecting the rotational speeds of the inner main shaft 26a and the outer main shaft 26b by measuring the rotational speeds of the predetermined shift gears on the counter shaft 27.

A drive sprocket 35 can be connected to the counter shaft 27, and a drive chain (not shown) can be wrapped around the drive sprocket 35, so that a drive force is transmitted from the counter shaft 27 through the drive chain to a rear wheel as a drive wheel. The AMT 16 may further include an engine speed sensor 36 opposed to the outer circumference of the primary driven gear 32, a gear position sensor 38 for detecting the present gear position according to the rotational position of the shift drum 24, a shift sensor 64 for detecting the rotational position of a shifter driven by the shift control motor 25, and a neutral switch 63 for detecting the neutral position of the shift drum 24. The throttle body 19 may be provided with a throttle angle sensor 47 for detecting a throttle angle.

The clutch hydraulic device 17 uses a lubricating oil for the engine 11 as a hydraulic fluid for driving the clutch CL. The clutch hydraulic device 17 may include an oil tank 39 and an oil supply passage 40 for supplying oil (hydraulic fluid) from the oil tank 39 to the first clutch CL1 and the second clutch CL2. The oil supply passage 40 can be provided with a hydraulic pump 41 as an oil pressure source and a valve (electronically controlled valve) 42 as an actuator. A return passage 43 is connected to the oil supply passage 40, and the return passage 43 may be provided with a regulator 44 for maintaining the oil pressure to be supplied to the valve 42 at a constant value. The valve 42 has a structure capable of individually applying oil pressures to the first clutch CL1 and the second clutch CL2. That is, the valve 42 may be composed of a first valve 42a connected to the first clutch CL1 and a second valve 42b connected to the second clutch CL2. The first and second valves 42a and 42b are respectively provided with oil return passages 45.

The first valve 42a is connected through a first passage to the first clutch CL1, and this first passage may be provided with a first clutch oil pressure sensor 75 for measuring an oil pressure generated in the first clutch CL1. Similarly, the second valve 42b is connected through a second passage to the second clutch CL2, and this second passage may be provided with a second clutch oil pressure sensor 76 for measuring an oil pressure generated in the second clutch CL2.

Connected to the AMT control unit 18 are a mode switch 49 for switching between an automatic transmission (AT) mode and a manual transmission (MT) mode, and a shift select switch 50 for instructing an upshift (UP) or a downshift (DN). The AMT control unit 18 includes a central processing unit (CPU) for controlling the valve 42 and the shift control motor 25 according to output signals from the sensors and switches mentioned above, thereby changing the gear position in the AMT 16 automatically or semi-automatically.

When the AT mode is selected, the AMT control unit 18 automatically changes the gear position according to information such as vehicle speed, engine speed, and throttle angle. When the MT mode is selected, the AMT control unit 18 upshifts or downshifts the transmission 21 according to the operation of the shift select switch 50. However, even when the MT mode is selected, the AMT control unit 18 can execute auxiliary automatic shift control for prevention of engine over-revolution and stall.

In the clutch hydraulic device 17, oil pressure can be applied to the valve 42 by the hydraulic pump 41, and this oil pressure may be controlled by the regulator 44 so as not to exceed an upper limit. When the valve 42a or 42b is opened by an instruction from the AMT control unit 18, the oil pressure is applied to the first clutch CL1 or the second clutch CL2, so that the primary driven gear 32 is connected through the first clutch CL1 or the second clutch CL2 to the inner main shaft 26a or the outer main shaft 26b. Conversely, when the valve 42 is closed to stop the application of the oil pressure, the first clutch CL1 and the second clutch CL2 are biased so as to be disconnected from the inner main shaft 26a and the outer main shaft 26b by return springs (see FIG. 3) built in the respective clutches CL1 and CL2.

The valve 42, which can drive the clutches CL1 and CL2 by opening or closing the first and second passages connecting the oil supply passage 40 to the clutches CL1 and CL2, can arbitrarily change the time from a full closed condition to a full open condition of the first and second passages according to a drive signal from the AMT control unit 18.

The shift control motor 25 can rotate the shift drum 24 according to an instruction from the AMT control unit 18. When the shift drum 24 is rotated, the shift forks 23 are selectively displaced in the axial direction of the shift drum 24 according to the shapes of the guide grooves formed on the outer circumference of the shift drum 24. Accordingly, the meshing gears on the counter shaft 27 and the main shaft 26 are changed to thereby effect upshifting or downshifting in the transmission 21.

In the AMT 16, the odd-numbered gears (e.g., first, third, and fifth gears) are supported to the inner main shaft 26a connected to the first clutch CL1, and the even-numbered gears (e.g., second, fourth, and sixth gears) are supported to the outer main shaft 26b connected to the second clutch CL2. Accordingly, during running with any odd-numbered gear, for example, the supply of oil pressure to the first clutch CL1 is continued to maintain the engaged condition of the first clutch CL1. In performing a gear shift from this odd-numbered gear, the next gear position is preliminarily determined by rotating the shift drum 24, so that the gear shift can be effected by only switching the first clutch CL1 to the second clutch CL2.

Referring also to FIG. 2, the odd-numbered drive gears M1, M3, and M5 are supported to the inner main shaft 26a connected to the first clutch CL1. The first drive gear M1 is formed integrally with the inner main shaft 26a. The third drive gear M3 may be mounted on the inner main shaft 26a so as to be axially slidable and non-rotatable relative to the inner main shaft 26a. The fifth drive gear M5 may be mounted on the inner main shaft 26a so as to be axially non-slidable and rotatable relative to the inner main shaft 26a. On the other hand, the even-numbered drive gears M2, M4, and M6 are supported to the outer main shaft 26b connected to the second clutch CL2. The second drive gear M2 is formed integrally with the outer main shaft 26b. The fourth drive gear M4 may be mounted on the outer main shaft 26b so as to be axially slidable and non-rotatable relative to the outer main shaft 26b. The sixth drive gear M6 may be mounted on the outer main shaft 26b so as to be axially non-slidable and rotatable relative to the outer main shaft 26b.

A plurality of driven gears C1 to C6 respectively meshing with the drive gears M1 to M6 are supported to the counter shaft 27. The first to fourth driven gears C1 to C4 may be mounted on the counter shaft 27 so as to be axially non-slidable and rotatable relative to the counter shaft 27. The fifth and sixth driven gears C5 and C6 may be mounted on the counter shaft 27 so as to be axially slidable and non-rotatable relative to the counter shaft 27. In the AMT 16, the drive gears M3 and M4 and the driven gears C5 and C6, i.e., the axially slidable gears among the above-described gears, are configured to be slid by the respective shift forks 23 to thereby engage or disengage any dog clutch, thus performing a gear shift.

When the first gear is selected, for example, the engine torque transmitted from the crankshaft 30 to the primary driven gear 32 is transmitted through the first clutch CL1 in its engaged condition to the inner main shaft 26a. The rotation of the inner main shaft 26a is further transmitted from the first drive gear M1 through the first driven gear C1 to the counter shaft 27. In this case, the dog clutch for the first speed is engaged between the first driven gear C1 and the fifth driven gear C5.

While the engine torque is being transmitted by the first gear, the dog clutch for the second speed can be preliminarily engaged between the sixth driven gear C6 and the second driven gear C2, thus performing a "preliminary shift" such that the gear shift from the first gear to the second gear is anticipated. At this time, the second clutch CL2 is in a disengaged condition. Accordingly, although the dog clutch for the second speed is engaged during running with the first gear, the engine torque is transmitted through the second drive gear M2 to the outer main shaft 26b, thereby idly rotating the outer main shaft 26b. When the second clutch CL2 is engaged and the first clutch CL1 is disengaged after performing the above preliminary shift, the transmission of engine torque can be switched smoothly and instantaneously from the first gear to the second gear.

In the shift drum 24, a "neutral waiting" position is set between the predetermined rotational positions for selecting the gear positions in such a manner that either the group of the even-numbered gears or the group of the odd-numbered gears which does not transmit the engine torque is brought into a neutral condition. Accordingly, the odd-numbered gears can be brought into a neutral condition during running with any even-numbered gear, and the even-numbered gears can be brought into a neutral condition during running with any odd-numbered gear.

Figure 3:
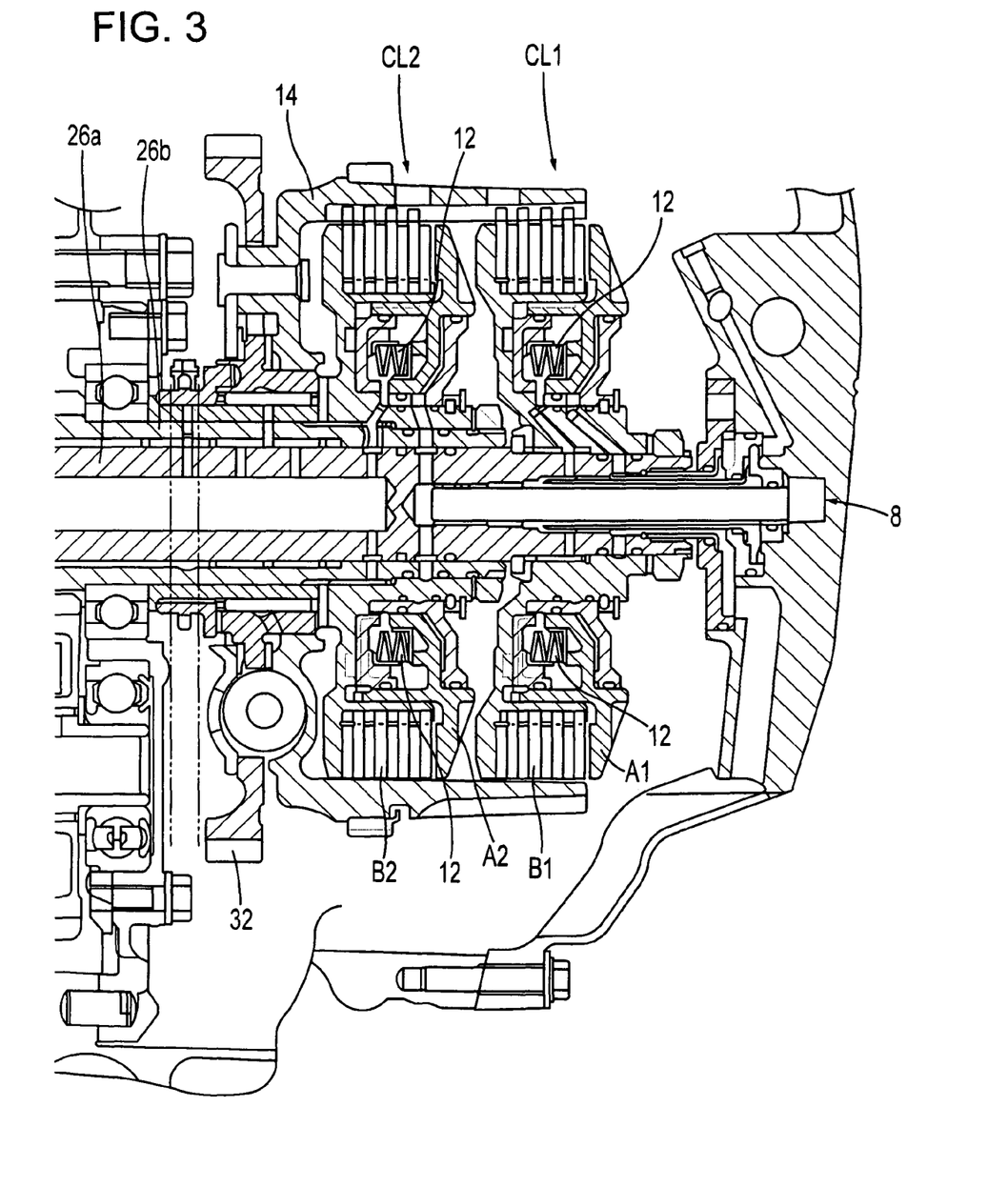
FIG. 3 is an enlarged sectional view of a first clutch and a second clutch according to one embodiment.

FIG. 3 is an enlarged sectional view of the first clutch CL1 and the second clutch CL2. As mentioned above, the transmission 21 has six pairs of shift gears between the main shaft and the counter shaft. The shift gear pair through which a rotational drive force is to be output can be selected according to the position of the slidable gears that are axially and slidably mounted on the main shaft and the counter shaft, and the engaged condition of the first clutch CL1 and the second clutch CL2. The twin clutch composed of the first clutch CL1 and the second clutch CL2 may be provided in a clutch case 14 rotating with the primary driven gear 32. The first clutch CL1 is non-rotatably mounted on the inner main shaft 26a, and the second clutch CL2 is non-rotatably mounted on the outer main shaft 26b. A plurality of clutch disks B1 may be provided between the clutch case 14 and the first clutch CL1, and a plurality of clutch disks B2 may be provided between the clutch case 14 and the second clutch CL2. The clutch disks B1 are composed of four driving friction disks non-rotatably supported to the clutch case 14, and four driven friction disks non-rotatably supported to the first clutch CL1. Similarly, the clutch disks B2 are composed of four driving friction disks non-rotatably supported to the clutch case 14, and four driven friction disks non-rotatably supported to the second clutch CL2.

Each of the first and second clutches CL1 and CL2 is configured in such a manner that, when oil pressure is supplied from the hydraulic pump 41 to the clutch, a frictional force is produced between the clutch disks to achieve the engagement of the clutch. A distributor 8 forming two oil passages having a double pipe structure in the inner main shaft 26a is embedded in the wall of a clutch cover mounted on a crankcase. When the oil pressure is supplied through the distributor 8 to the first clutch CL1, a clutch piston A1 is slid leftward as viewed in FIG. 3 against a biasing force of a return spring 12 as an elastic member, thereby achieving the engagement of the first clutch CL1. On the other hand, when the oil pressure is supplied to the second clutch CL2, a clutch piston A2 is slid leftward as viewed in FIG. 3 against a biasing force of a return spring 12, thereby achieving the engagement of the second clutch CL2. When the supply of the oil pressure to the first clutch CL1 is stopped, the clutch piston A1 is returned to its initial position by the biasing force of the corresponding return spring 12. Similarly, when the supply of the oil pressure to the second clutch CL2 is stopped, the clutch piston A2 is returned to its initial position by the biasing force of the corresponding return spring 12.

Figure 4:
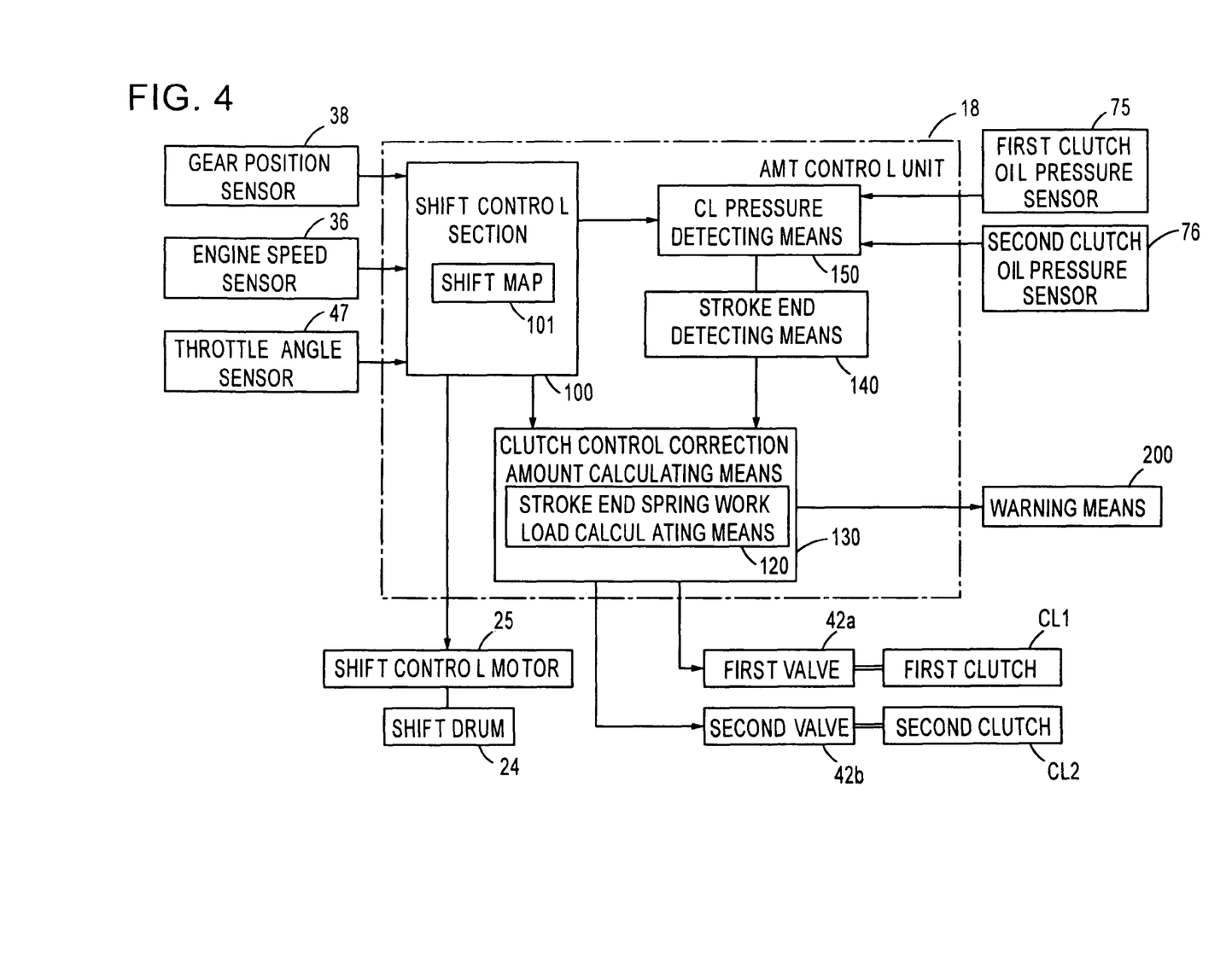
FIG. 4 is a block diagram showing the configuration of an AMT control unit and its peripheral equipment according to one embodiment.

FIG. 4 is a block diagram showing the configuration of the AMT control unit 18 and its peripheral equipment according to one embodiment. In FIG. 4, the same reference numerals as those shown in FIGS. 1 to 3 denote the same or like parts. The AMT control unit 18 includes a shift control section 100 storing a shift map 101. The shift control section 100, including clutch control means, drives the shift control motor 25 and the valve 42 (42a or 42b) by using the shift map 101 (such as a three-dimensional map) according to output information from the gear position sensor 38, the engine speed sensor 36, the throttle angle sensor 47, and vehicle speed information from a vehicle speed sensor (not shown) during normal running of the vehicle, thus performing a shift operation. Further, the shift control section 100 may also function as shift condition detecting means for detecting a shift condition such as a condition where the AMT 16 is being shifted according to a shift signal generated in the automatic shifting mode using the shift map 101 or in the semiautomatic shifting mode by the operation of the shift select switch 50. The condition where the AMT 16 is being shifted may be detected according to the output signals from the gear position sensor 38 and the engine speed sensor 36.

As mentioned above, the AMT 16 (see FIG. 1) according to one embodiment is configured in such a manner that oil pressure is supplied to the clutch by driving the actuator (valve) to thereby drive the clutch in its engaging direction against the biasing force of the corresponding return spring 12 (see FIG. 3). Accordingly, if the clutch disks wear to cause an increase in stroke of the clutch disks until they come into contact with each other or if the return spring is replaced by another return spring having a larger biasing force, a load required to make the clutch disks come into contact with each other (return spring work load) is increased. If the clutch is driven in the same manner as it was before such a change occurs, there is a possibility that the time from the start of driving of the clutch to the achievement of the engaged condition of the clutch may be increased or a clutch torque capacity may become excessive or lacking to cause a change in starting and shifting feel. To cope with this problem, the AMT control unit 18 according to this embodiment can detect the load at the time the clutch disks come into contact with each other, i.e., at the time the clutch reaches "a stroke end position," such that the stroke of the clutch disks becomes a maximum value and can calculate a control correction amount for the clutch according to a change in this load. In the case of a hydraulic clutch, the work load can be obtained according to an oil pressure supplied to the clutch.

The AMT control unit 18 may include oil pressure detecting means 150 for detecting the oil pressures generated in the first and second clutches CL1 and CL2 according to the output signals from the first and second clutch oil pressure sensors 75 and 76. The oil pressure detecting means 150 also inputs the drive signals for the first and second valves 42a and 42b from the shift control section 100 and can estimate the oil pressures generated in the clutches CL1 and CL2 from the drive control amounts for the first and second valves 42a and 42b.

The AMT control unit 18 may further include a stroke end detecting unit or means 140 for detecting that the clutch has reached the stroke end position according to the oil pressure detected by the oil pressure detecting unit or means 150. The AMT control unit 18 may further include a clutch control correction amount calculating unit or means 130 having a stroke end spring work load calculating unit or means 120 for calculating the return spring work load according to the oil pressure detected at the time the clutch has reached the stroke end position.

Figure 5:
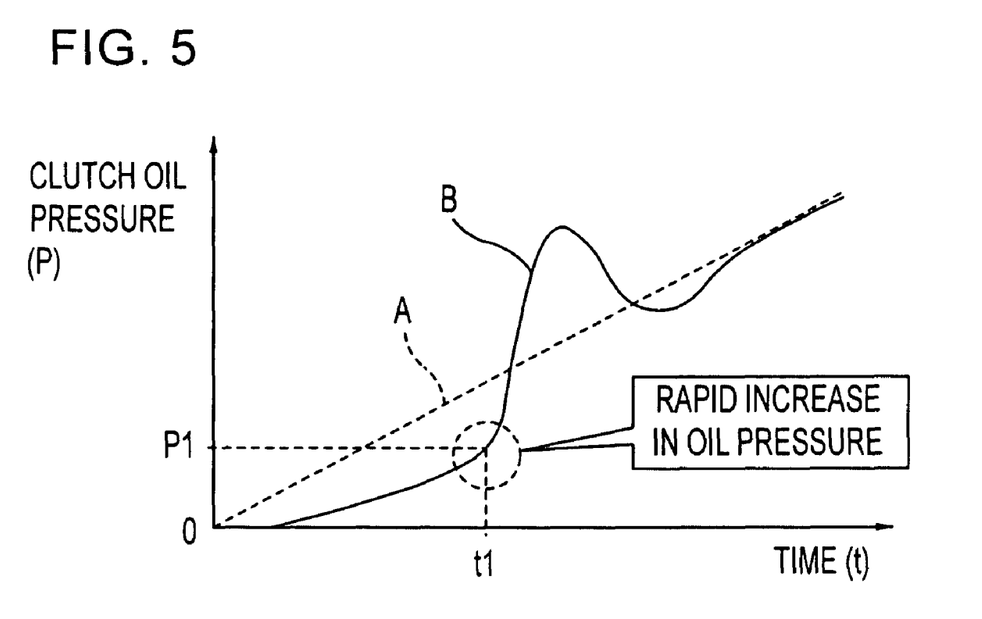
FIG. 5 is a graph showing a change in clutch oil pressure with time in driving the clutch in its engaging direction according to one embodiment.

A change in clutch oil pressure with time will now be described with reference to FIG. 5. FIG. 5 is a graph showing a change in clutch oil pressure in driving the clutch in its engaging direction. In FIG. 5, the broken line A shows a target oil pressure and the solid line B shows an actual oil pressure detected by the oil pressure detecting means 150. As mentioned above, the hydraulic clutch according to this embodiment is configured in such a manner that when an oil pressure is supplied to the clutch, the clutch is driven in its engaging direction. Accordingly, immediately after opening the valve at the time t0 to engage the clutch, the clutch disks are moved toward each other, so that the actual oil pressure B is not increased at once. However, the actual oil pressure B is rapidly increased at the time t1 as shown in an encircled area in FIG. 5. Thereafter, the actual oil pressure B becomes larger than the target oil pressure A and converges to the target oil pressure A.

Such a rapid increase in the actual oil pressure B at the time t1 is caused by the fact that the clutch disks have come into contact with each other, i.e., the clutch has reached the stroke end position such that the stroke of the clutch disks is a maximum value. Accordingly, by observing a change in the actual oil pressure B, it is possible to estimate that the clutch has reached the stroke end position. In this embodiment, the amount of change in the actual oil pressure B is obtained from the differential value thereof, and when this amount of change becomes larger than a predetermined value, it is determined that the clutch has reached the stroke end position. In the graph shown in FIG. 5, the amount of change in the actual oil pressure B at the time t1 is larger than a predetermined value, so that an oil pressure P1 detected at the time t1 is detected as the oil pressure at the stroke end position.

Referring back to FIG. 4, the stroke end spring work load calculating unit or means 120 calculates an actual return spring work load (actual work load) that is actually generated at the stroke end position by multiplying the oil pressure detected at the stroke end position by the pressure receiving area of the clutch piston (see FIG. 3) in calculating the clutch control correction amount. When the actual work load is larger than a reference value, it is estimated that the clutch disks are worn to cause an increase in stroke and accordingly cause an increase in operational amount of the return spring, or that the return spring has been replaced by another return spring having a larger biasing force. Conversely, when the actual work load is smaller than the reference value (reference work load to be hereinafter described), it is estimated that the biasing force of the return spring has been reduced because of age deterioration or related causes.

Figure 6:
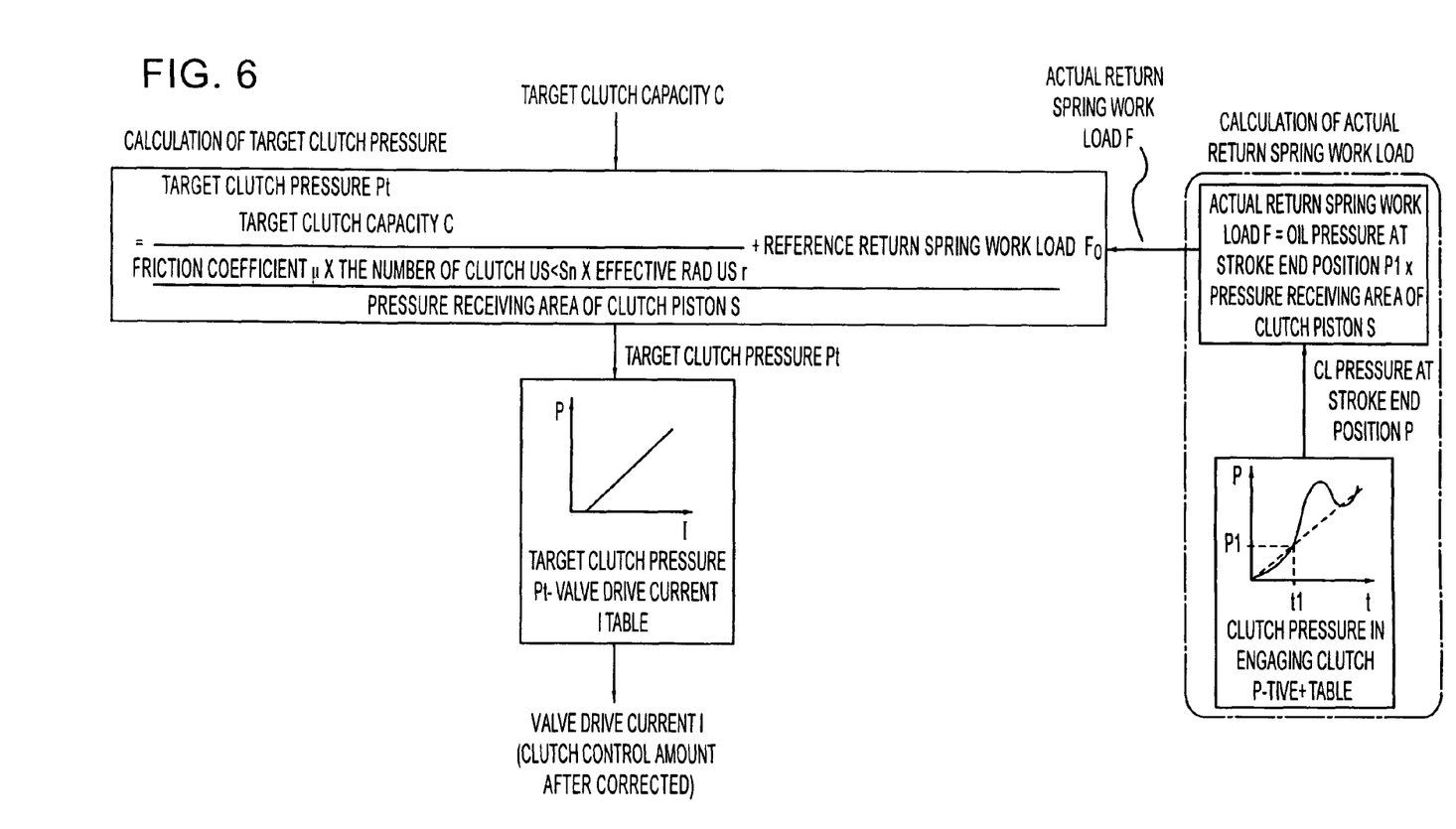
FIG. 6 is a block diagram showing the procedure of calculating a clutch control correction amount according to one embodiment.

The procedure of calculating the clutch control correction amount in consideration of the actual work load will now be described with reference to FIG. 6. FIG. 6 is a block diagram showing the procedure of calculating a clutch control correction amount according to oil pressure detected at the stroke end position. The processing for calculating the control correction amount may be performed by the clutch control correction amount calculating means 130. A target clutch pressure Pt to be generated in each clutch is calculated by the expression of $[\{C/(\mu h \times n \times r) + F0\}/S]$, where C is the target clutch capacity, μh is the corrected friction coefficient, n is the number of clutch disks, r is the effective radius, F0 is the reference return spring work load, and S is the pressure receiving area of the clutch piston. The reference return spring work load (reference work load) F0 is a fixed value predetermined according to, for example, a design value. According to this embodiment, an actual return spring work load (actual work load) F actually generated in the clutch is detected according to a clutch oil pressure, and the target clutch pressure Pt is calculated by using this actual work load F.

As shown in the clutch pressure P–time t table in FIG. 5, the oil pressure P1 is measured at the time the amount of change in actual oil pressure becomes larger than a predetermined value. The actual return spring work load F is calculated by multiplying this oil pressure P1 by the pressure receiving area S of the clutch piston. This actual work load F is used in place of the reference work load F0 to calculate the target clutch pressure Pt.

The target clutch pressure Pt thus obtained in consideration of the change in condition of the return spring is applied to a data table defining the relation between target clutch pressure Pt and valve drive current I, thereby obtaining a valve (actuator) drive current I for the correction control of the clutch, i.e., a clutch control amount corrected in consideration of the actual work load. The clutch control correction amount calculating means 130 recognizes the difference between the clutch control amount before being corrected and the clutch control amount after being corrected and monitors a change in this difference.

Referring back to FIG. 4, the clutch control correction amount calculating means 130 controls the operation of the first and second clutches CL1 and CL2 by using the valve drive current I calculated above. Accordingly, even when a change occurs in the condition of the clutch due to a change in characteristics of the return spring, a change in operation or running feel can be prevented.

The clutch control amount calculation processing using the actual work load may be performed at the time of vehicle inspection or the like. Accordingly, even when there are variations in accuracy of the return spring, it is possible to make the initial clutch settings uniform prior to shipment of all vehicles from a factory.

Further, the clutch control correction amount calculating means 130 may be connected to warning means 200, such as a warning lamp or a speaker, for giving a warning to the operator when the clutch correction control amount becomes larger than a predetermined value. Accordingly, it is possible to urge the operator to replace the clutch disks, the return spring, or to inspect a drive power transmitting system from the clutch to the drive wheel, for example.

Figure 7:
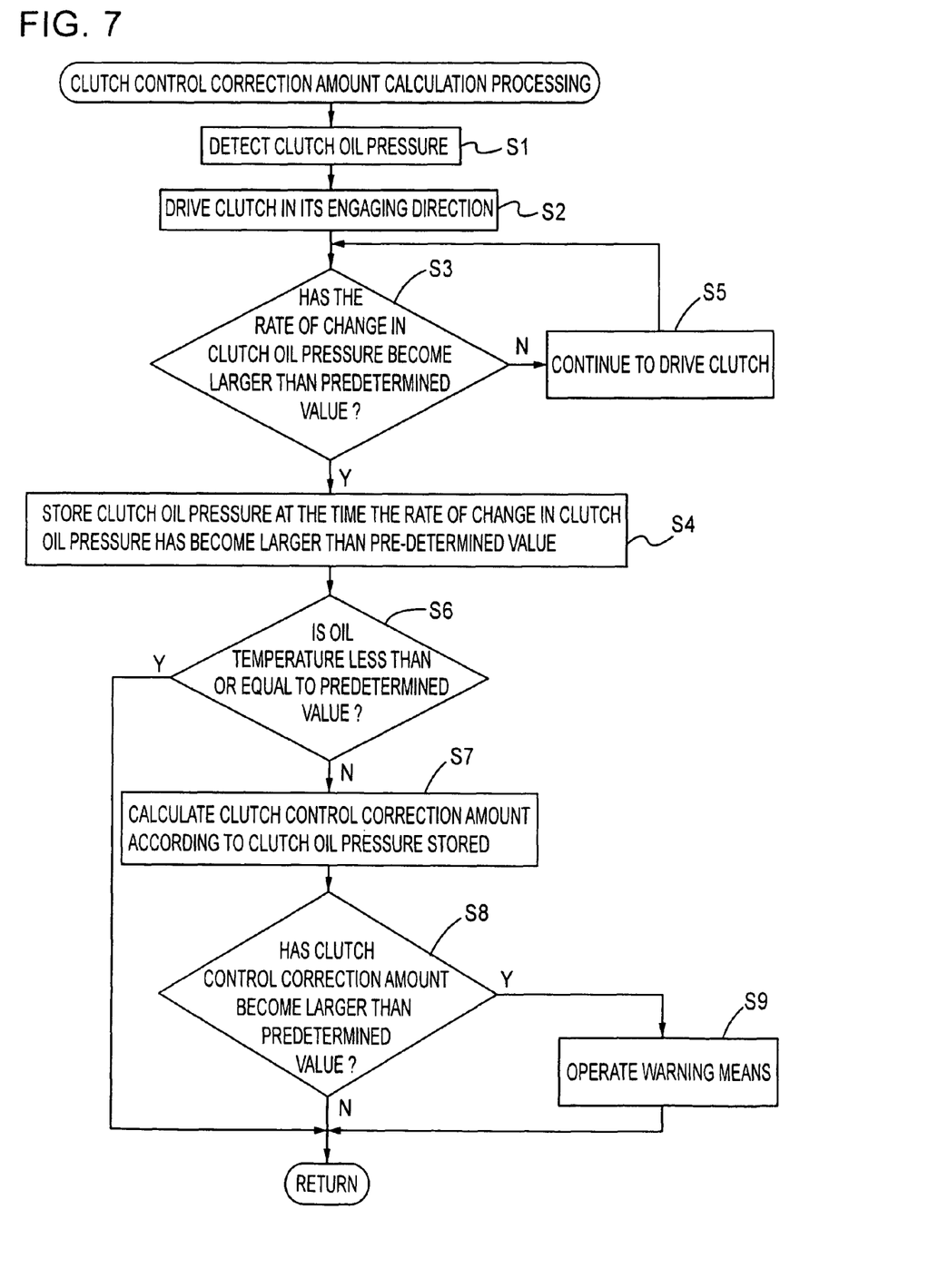
FIG. 7 is a flowchart showing the flow of clutch control correction amount calculation processing according to one embodiment.

FIG. 7 is a flowchart showing the flow of clutch control correction amount calculation processing according to one embodiment. In step S1, the oil pressure detecting means 150 starts detecting the oil pressures generated in the first and second clutches CL1 and CL2. In step S2, the first clutch CL1 or the second clutch CL2 subjected to the control correction amount calculation processing starts to be driven in its engaging direction. In the case that the transmission is in a neutral condition, the control correction amount calculation processing, i.e., the calculation processing for the clutch control amount after correction may be performed alternately for the first and second clutches CL1 and CL2. Further, when the transmission is in a drive condition where a predetermined gear position is selected, the control correction amount calculation processing may be performed for any disengaged one of the clutches CL1 and CL2.

In step S3, it is determined whether the rate of change in clutch oil pressure has become larger than a predetermined value. If the answer in step S3 is affirmative, it is determined that the clutch has reached the stroke end position and the process then proceeds to step S4. If the answer in step S3 is negative, it is determined that the clutch has not yet reached the stroke end position and the process then proceeds to step S5 to continue to drive the clutch. Thereafter, the process returns to step S3.

In step S4, the clutch control correction amount calculating means 130 stores the oil pressure measured at the time the rate of change in clutch oil pressure has become larger than the predetermined value, i.e., at the time the clutch has reached the stroke end position. In step S6, it is determined whether the temperature of the hydraulic fluid in the clutch detected by an oil temperature sensor (not shown) is less than or equal to a predetermined value (e.g., 50° C.). The determination in step S6 is performed because the measured value for the oil pressure is influenced by a change in viscosity of the hydraulic fluid. If the answer in step S6 is affirmative, it is determined that the temperature of the hydraulic fluid is low and its viscosity is therefore high. In this case, it is determined that the condition of the clutch is not suitable for the calculation of the clutch control correction amount, and the process is accordingly ended. On the other hand, if the answer in step S6 is negative, it is determined that the temperature of the hydraulic fluid has become higher than the predetermined value to reach a clutch condition suitable for the calculation of the clutch control correction amount. Then, the process proceeds to step S7.

In step S7, the calculation processing shown in FIG. 6 is performed by using the oil pressure stored in step S4, thereby calculating a clutch control correction amount. In step S8, it is determined whether the clutch control correction amount has become larger than a predetermined value. If the answer in step S8 is negative, the process is ended. If the answer in step S8 is affirmative, i.e., if the clutch control correction amount has become larger than the predetermined value, it is determined that the inspection of the clutch disks or the return spring is required and the process then proceeds to step S9 to operate the warning means 200 (see FIG. 4), thereby giving a warning to the operator. Then, the process is ended. The clutch control amount calculation processing mentioned above may be performed before starting the vehicle, after starting the engine, while the vehicle is stopped, or while the vehicle is running. Further, the clutch control correction amount calculation processing may be performed at given intervals (e.g., at intervals of several days), so as to reduce the burden on the processing.

According to the clutch control device in an embodiment of the present invention, the stroke end detecting means detects that the clutch has reached the stroke end position according to the amount of change in oil pressure in driving the clutch in its engaging direction. The control correction amount calculating means calculates a work load generated in the return spring according to the oil pressure detected at the time the clutch has reached the stroke end position, and then calculates a clutch control correction amount according to the difference between the work load calculated above and a predetermined reference value. Accordingly, the work load on the return spring can be calculated according to the oil pressure supplied to the clutch without the need for any special load sensor or the like, thus obtaining the clutch control correction amount.

The configuration of the clutches and the valves in the twin clutch type transmission and the reference value for the amount of change in oil pressure in determining the stroke end position, for example, are not limited to those described in the above embodiments, but various modifications may be made. For example, while the clutch control device is applied to a twin clutch type transmission in certain embodiments, other embodiments of the present invention are also applicable to a single clutch type transmission. Further, the clutch control device according to certain embodiments is applicable not only to a motorcycle, but also to a three-wheel vehicle and a four-wheel vehicle, for example.

In one embodiment, the AMT control unit 18 may include a single component, controller, or processor. Alternatively, in some embodiments, the AMT control unit 18 may include multiple components, controllers, or processors.

Thus, according to one embodiment, a clutch control device for a hydraulic clutch is provided. The clutch control device is operable to connect and disconnect a rotational drive force from an engine to a transmission in a vehicle. Clutch disks are operated in their engaging direction against a biasing force of a return spring by driving an actuator. The clutch control device includes clutch control means for controlling the clutch, stroke end detecting means for detecting that the clutch has reached a stroke end position where the clutch disks are in contact with each other, and oil pressure detecting means for detecting an oil pressure supplied to the clutch. The clutch control device may further include control correction amount calculating means for calculating a work load generated in the return spring according to the oil pressure detected at the time the clutch has reached the stroke end position, and calculating a control correction amount for the clutch according to the difference between the work load calculated above and a predetermined reference value.

According to another embodiment, when the rate of change in the oil pressure becomes larger than a predetermined value, the stroke end detecting means determines that the clutch has reached the stroke end position.

According to another embodiment, the clutch is of a twin clutch type composed of a first clutch and a second clutch provided on a main shaft. The engaged conditions of the first and second clutches may be alternately switched in every shift operation to thereby transmit the rotational drive force from the engine to the transmission.

According to another embodiment, the calculation of the control correction amount by the control correction amount calculating means is performed after the temperature of a hydraulic fluid for driving the clutch becomes higher than a predetermined value.

According to another embodiment, the calculation of the control correction amount by the control correction amount calculating means is performed at given intervals.

According to another embodiment, when the control correction amount for the clutch becomes larger than a predetermined value, a warning is given by warning means.

According to a further embodiment, a clutch control correction amount calculating method is provided for a hydraulic clutch for connecting and disconnecting a rotational drive force from an engine to a transmission in a vehicle. Clutch disks are operated in their engaging direction against a biasing force of a return spring by driving an actuator. The clutch control correction amount calculating method including the steps of detecting that the clutch has reached a stroke end position where the clutch disks are in contact with each other, and calculating a work load generated in the return spring according to an oil pressure detected at the time the clutch has reached the stroke end position. The method further includes calculating a control correction amount for the clutch according to the difference between the work load generated above and a predetermined reference value.

Thus, according to one aspect of the invention, the clutch control device includes the clutch control means for controlling the clutch, the stroke end detecting means for detecting that the clutch has reached the stroke end position where the clutch disks are in contact with each other, the oil pressure detecting means for detecting the oil pressure supplied to the clutch, and the control correction amount calculating means for calculating the work load generated in the return spring according to the oil pressure detected at the time the clutch has reached the stroke end position and calculating the control correction amount for the clutch according to the difference between the work load calculated above and the predetermined reference value. With this configuration, the work load on the return spring can be calculated according to the oil pressure supplied to the clutch without providing any special load sensor or the like, thereby obtaining the control correction amount for the clutch. Accordingly, even when the spring constant of the return spring changes from an initial set value because of variations in product quality of the return spring or replacement or aged deterioration of the return spring, or even when the stroke of the clutch disks from the disengaged condition to the engaged condition changes because of wear of the clutch disks, a change in running feel can be prevented by applying the calculated control correction amount to perform clutch control.

According to another embodiment, the stroke end detecting means determines that the clutch has reached the stroke end position when the rate of change in the oil pressure becomes larger than the predetermined value. Accordingly, the stroke end position of the clutch can be easily detected by using the characteristics that when the clutch disks come into contact with each other in driving the clutch in its engaging direction, the oil pressure is rapidly increased.

According to another example, the clutch is of a twin clutch type composed of the first clutch and the second clutch provided on the main shaft, and the engaged conditions of the first and second clutches are alternately switched in every shift operation to thereby transmit the rotational drive force from the engine to the transmission. With this configuration, even while the vehicle is running in the condition where a predetermined shift gear is selected and either the first clutch or the second clutch is engaged, the control correction amount for the clutch can be calculated by using the disengaged clutch. Accordingly, even when the characteristics of the return spring change or the wear of the clutch disks is advanced during running of the vehicle, proper clutch control can be always performed.

According to another embodiment, the calculation of the control correction amount by the control correction amount calculating means is performed after the temperature of the hydraulic fluid for driving the clutch becomes higher than the predetermined value. Accordingly, the temperature condition in performing the calculation of the control correction amount can be set to thereby prevent an influence of a change in viscosity of the hydraulic fluid upon the result of calculation of the control correction amount.

According to a further embodiment, the calculation of the control correction amount by the control correction amount calculating means is performed at given intervals. Accordingly, the control correction amount for the clutch can be periodically updated, so that proper clutch control can always be performed.

According to another embodiment, a warning is given by the warning means when the control correction amount for the clutch becomes larger than the predetermined value. Accordingly, it is possible to urge the operator to inspect or replace the clutch disks or the return spring.

According to another example, the clutch control correction amount calculating method includes the steps of detecting that the clutch has reached the stroke end position where the clutch disks are in contact with each other, calculating the work load generated in the return spring according to the oil pressure detected at the time the clutch has reached the stroke end position, and calculating the control correction amount for the clutch according to the difference between the work load generated above and the predetermined reference value. Accordingly, the work load on the return spring can be calculated according to the oil pressure supplied to the clutch without providing any special load sensor or the like, thereby obtaining the control correction amount for the clutch.

DESCRIPTION OF REFERENCE NUMERALS

11: Engine
12: Return spring
14: Clutch case
16: AMT
25: Shift control motor
42: Valve
26a: Inner main shaft
26b: Outer main shaft
27: Counter shaft
36: Engine speed sensor
42a: First valve
42b: Second valve
47: Throttle angle sensor
75: First clutch oil pressure sensor
76: Second clutch oil pressure sensor
100: Shift control section (clutch control means)
101: Shift map
120: Stroke end spring work load calculating means
130: Clutch control correction amount calculating means
140: Stroke end detecting means
150: Oil pressure detecting means
200: Warning means
M1 to M6: First to sixth drive gears
C1 to C6: First to sixth driven gears
CL1: First clutch
CL2: Second clutch
A1, A2: Clutch piston
B1, B2: Clutch disks

We claim:

1. A clutch control device, comprising:
a clutch control configured to control a hydraulic clutch comprising clutch disks;
a stroke end detector configured to detect that said clutch has reached a stroke end position where said clutch disks are in contact with each other;
an oil pressure detector configured to detect an oil pressure supplied to said clutch; and
a control correction amount calculator configured to calculate a work load generated in a return spring of said clutch disks according to the oil pressure detected at a time when said clutch has reached said stroke end position, and to calculate a control correction amount according to a difference between said calculated work load and a predetermined reference work load value, wherein the control correction amount determines a drive current that controls said clutch.

2. The clutch control device according to claim 1, wherein when a rate of change in said oil pressure becomes larger than a predetermined value, said stroke end detector is configured to determine that said clutch has reached said stroke end position.

3. The clutch control device according to claim 1, wherein said clutch comprises a twin clutch composed of a first clutch and a second clutch provided on a main shaft, and engaged conditions of said first and second clutches are alternately switched in shift operations to transmit a rotational drive force from an engine to a transmission.

4. The clutch control device according to claim 1, wherein said control correction amount calculator is configured to calculate said control correction amount after the temperature of a hydraulic fluid for driving said clutch becomes higher than a predetermined value.

5. The clutch control device according to claim 1, wherein said control correction amount calculator is configured to calculate said control correction amount at given intervals.

6. The clutch control device according to claim 1, wherein a warning unit is configured to provide a warning when the control correction amount for said clutch becomes larger than a predetermined value.

7. A clutch control correction amount calculating method for a hydraulic clutch for connecting and disconnecting a rotational drive force from an engine to a transmission in a vehicle, wherein clutch disks are operated in their engaging direction against a biasing force of a return spring by driving an actuator, said method comprising:
detecting that said clutch has reached a stroke end position where said clutch disks are in contact with each other;
calculating a work load generated in said return spring according to an oil pressure detected when said clutch has reached said stroke end position; and
calculating a control correction amount according to a difference between said calculated work load and a predetermined reference work load value, wherein the control correction amount determines a drive current that controls said clutch.

8. The clutch control correction amount calculating method according to claim 7, wherein, when a rate of change in said oil pressure becomes larger than a predetermined value, the method further comprises determining that said clutch has reached said stroke end position.

9. The clutch control correction amount calculating method according to claim 7, wherein said clutch comprises a twin clutch composed of a first clutch and a second clutch provided on a main shaft, and engaged conditions of said first and second clutches are alternately switched in every shift operation to transmit the rotational drive force from said engine to said transmission.

10. The clutch control correction amount calculating method according to claim 7, further comprising calculating said control correction amount after a temperature of a hydraulic fluid for driving said clutch becomes higher than a predetermined value.

11. The clutch control correction amount calculating method according to claim 7, wherein said calculating a control correction amount comprises calculating said control correction amount at given intervals.

12. The clutch control correction amount calculating method according to claim 7, further comprising providing a warning when the control correction amount for said clutch becomes larger than a predetermined value.

13. A clutch control device, comprising:
clutch control means for controlling a hydraulic clutch comprising clutch disks;
stroke end detecting means for detecting that said clutch has reached a stroke end position where said clutch disks are in contact with each other;
oil pressure detecting means for detecting an oil pressure supplied to said clutch; and
control correction amount calculating means for calculating a work load generated in a return spring of said clutch disks according to the oil pressure detected when said clutch has reached said stroke end position, and for calculating a control correction amount according to a difference between said calculated work load and a predetermined reference work load value, wherein the control correction amount determines a drive current that controls said clutch.

14. A computer program, embodied on a computer readable medium, the computer program configured to control a processor to perform operations comprising:

detecting that a hydraulic clutch comprising clutch disks has reached a stroke end position where said clutch disks are in contact with each other;

calculating a work load generated in a return spring of said clutch disks according to an oil pressure detected when said clutch has reached said stroke end position; and     calculating a control correction amount according to a difference between said calculated work load and a predetermined reference work load value, wherein the control correction amount determines a drive current that controls said clutch.

\* \* \* \* \*